United States Patent [19]
Burns et al.

[11] Patent Number: 6,016,198
[45] Date of Patent: Jan. 18, 2000

[54] ELECTRO-OPTIC REFLECTION DEVICE WITH TRAVELING-WAVE STRUCTURE

[75] Inventors: William K. Burns, Alexandria, Va.; Robert P. Moeller, Fort Washington, Md.

[73] Assignee: The United States of America as represented by the Secretary of the Navy, Washington, D.C.

[21] Appl. No.: 08/966,197

[22] Filed: Nov. 7, 1997

[51] Int. Cl.[7] ...................................................... G01B 9/02
[52] U.S. Cl. .................................... 356/345; 385/2; 385/3
[58] Field of Search .................................... 385/2, 40, 45

[56] References Cited

U.S. PATENT DOCUMENTS

5,416,859   5/1995   Burns et al. ................................. 385/3
5,886,807   3/1999   Cummings ............................... 359/263

*Primary Examiner*—Robert H. Kim
*Assistant Examiner*—Andrew H. Lee
*Attorney, Agent, or Firm*—Barry A. Edelberg; Edward F. Miles

[57] ABSTRACT

A Mach-Zehnder interferometer has electrodes configured to act as a microwave transmission line. The optical waveguide arms have a reflective coating on their distal ends so that light is reflected back through the arms. The microwave transmission line is open-ended in a vicinity of the reflective coating so that microwave energy is reflected at the open end. Thus, the interferometer supports a traveling wave in a reflective configuration, and the distance over which interaction takes place can be effectively doubled.

14 Claims, 6 Drawing Sheets

000
ELECTRO-OPTIC REFLECTION DEVICE WITH TRAVELING-WAVE STRUCTURE

FIELD OF THE INVENTION

The invention is directed to an electro-optic modulator and more specifically to an electro-optic modulator of the Mach-Zehnder interferometer type.

DESCRIPTION OF RELATED ART

In general, electro-optic amplitude modulators can be made with two types of electrode structures: (1) devices whose response is limited by electrode resistance and capacitance (RC) which operate at frequencies up to 1–2 Ghz, and (2) traveling-wave devices which operate at frequencies up to the tens of GHz. In both cases, the most important parameter is drive voltage, which is usually defined as the voltage required to realize a 180° phase shift (represented by the notation $V_\pi$). In an RC-limited device, the applied voltage is constant along the device length, and the drive voltage is inversely proportional to the length of the electrodes.

The traveling-wave devices use planar microwave waveguides fabricated over an integrated optic waveguide structure. In this case, the electrical field is delivered as a propagating mode in a waveguide. RF losses in the waveguide can become significant at high frequencies. The field (voltage) propagates with a loss factor $e^{-\alpha z}$, where $\alpha$ is the loss coefficient and z is the distance of propagation. Thus, $\alpha$ is measured in units of 1/length. Again, drive voltage decreases with electrode length, but not quite linearly as loss becomes important. Generally device lengths are limited by available lengths of the electro-optic substrate, which for $LiNbO_3$ is about 4–5 cm or less.

Traveling-wave electrode structures are now commonly used on integrated optic Mach-Zehnder interferometers to achieve amplitude modulation with broadband operation. On $LiNbO_3$ substrates, operation to 40 GHz can be readily achieved with low drive voltage. These devices are velocity-matched; i.e., the surface microwave waveguide is designed so that the optical and electrical waves have the same phase velocity. For a good velocity-matched device, optical response at high frequencies is primarily a function of RF loss.

Figure 1:
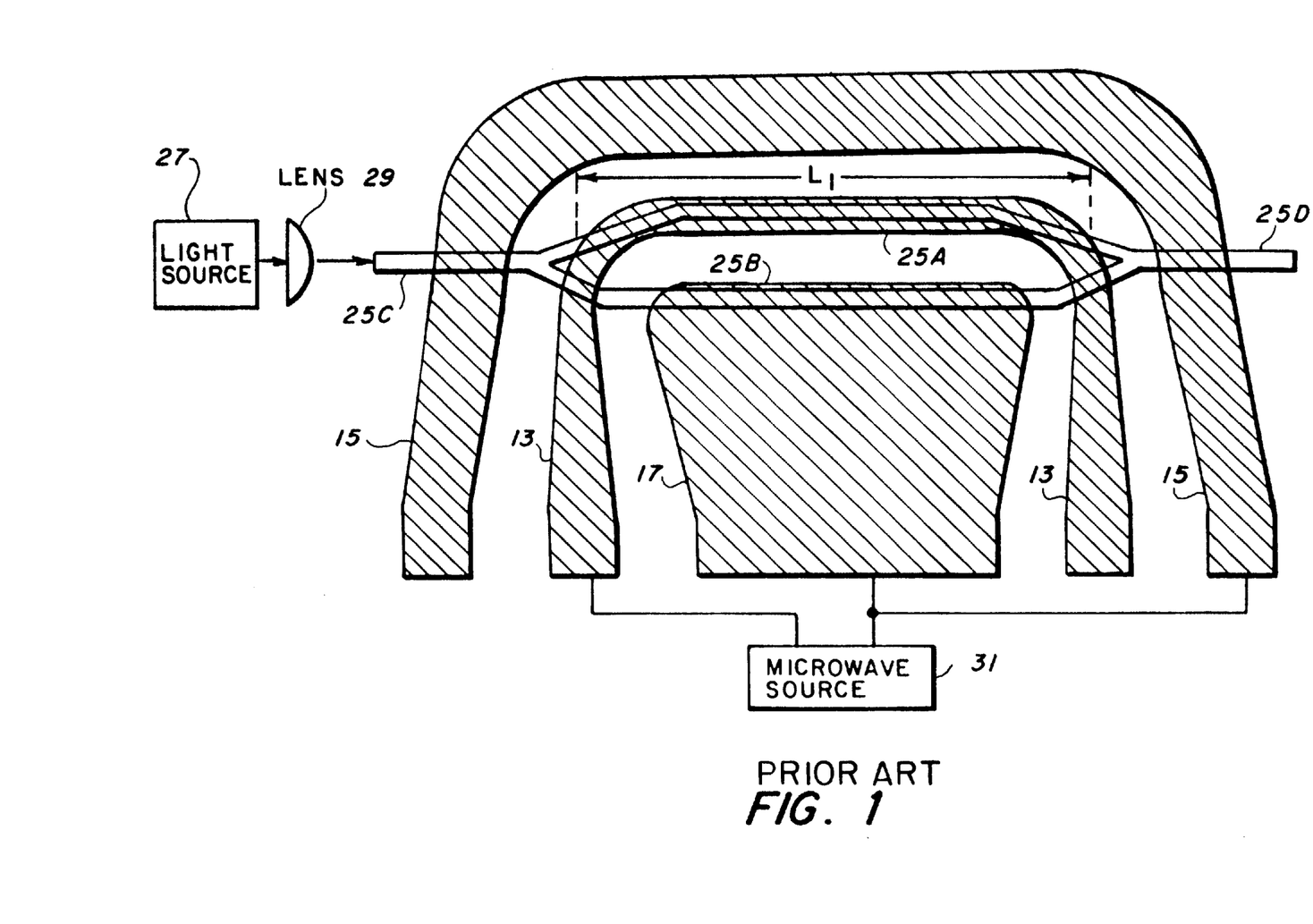
FIG. 1 shows a first type of Mach-Zehnder interferometer according to the prior art.

A known electro-optic amplitude modulator with a traveling-wave electrode structure is shown in FIG. 1. FIG. 1 is a Mach-Zehnder interferometer. This known modulator interferometer is described in detail in the following references: U.S. Pat. No. 5,416,859, issued May 16, 1995, to Burns et al; see also Gopalakrishnan et al., Performance and Modeling of Broadband $LiNbO_3$ Traveling Wave Optical Intensity Modulators, *Jounzal of Lightwave Technology*, Vol. 12, No. 10, October, 1994, pp. 1807–1819; and Gopalakrishnan et al, 40 Ghz, Low Half-Wave Voltage Ti: $LiNbO_3$ Intensity Modulator, *Electronics Letters*, Vol. 28, No. 9, Apr. 23, 1992, pp. 826–7. The disclosures of these three references are hereby incorporated by reference in their entirety into the present disclosure.

Gold electrodes 13, 15 and 17 form a microwave transmission line because of constant impedance along the length of propagation of microwaves in these electrodes. Such a microwave transmission line can be analogized to a coaxial transmission line, in which central electrode 13 corresponds to the inner conductor and side electrodes 15, 17 correspond to the outer conductor. Electrode 13 is connected to one terminal of microwave source 31, while electrodes 15, 17 are connected to the other terminal. Light from light source 27 is applied by lens 29 to input waveguide 25C, which branches, in electrical parallel, into optical waveguide arm 25A, which is disposed under central conductor 13, and optical waveguide arm 25B, which is disposed under side electrode 17. Because of interaction between the microwave traveling wave propagating in gold electrodes 13, 15 and 17 and the light propagating in optical waveguide arms 25A, 25B, the light in optical waveguide arm 25A is shifted in phase relative to the light in optical waveguide arm 25B. More specifically, because of the electro-optic properties of $LiNbO_3$, optical waveguide arm 25A has an index of refraction which varies in accordance with the intensity of the microwave traveling wave. The two portions of the light recombine and pass into output waveguide 25D. The degree of phase shift determines whether the light in output waveguide 25D propagates at a base mode or at a higher-order mode. If output waveguide 25D is constructed as a single-mode waveguide, the base mode is passed, whereas the higher-order mode is not passed. The arrangement shown provides an electrode length (interaction length) $L_1$.

Figure 2:
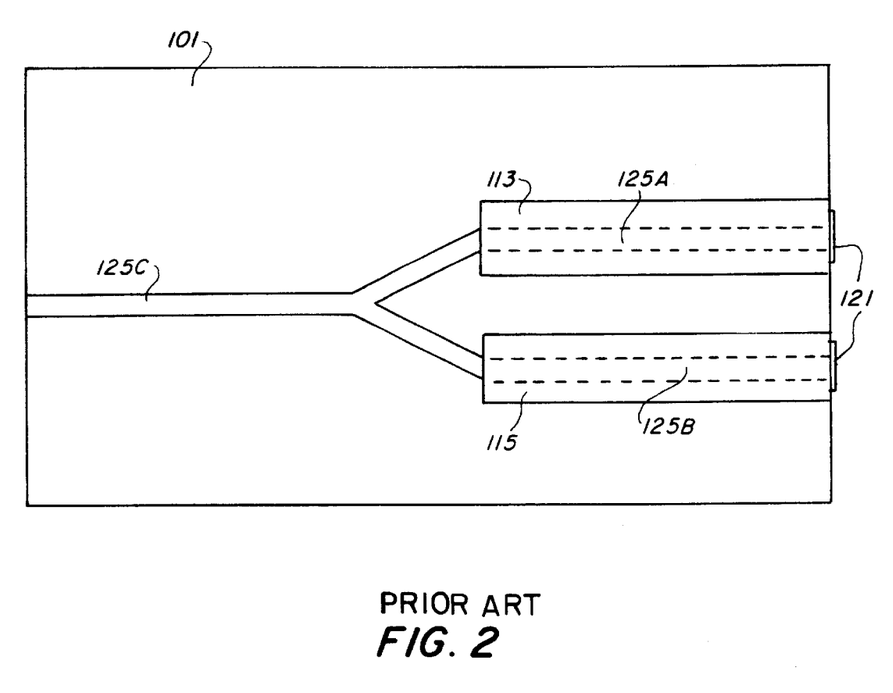
FIG. 2 shows a second type of Mach-Zehnder interferometer according to the prior art.

FIG. 2 shows a known reflective Mach-Zehnder interferometer, which works similarly to the known non-reflective Mach-Zehnder interferometer of FIG. 1, except with the following differences. Substrate 101 has formed thereon a waveguide comprising input/output waveguide 125C which branches into optical waveguide arms 125A, 125B. Instead of rejoining into a separate output waveguide, optical waveguide arms 125A, 125B have reflective 11 coating 121 formed thereon, so that light propagating through optical waveguide arms 125A, 125B, is reflected back into input/output waveguide 125C. Optical waveguide arm 125A has positive-voltage electrode 113 formed thereon, while optical waveguide arm 125B has ground electrode 115 formed thereon. Electrodes 113, 115 are not designed to form a microwave transmission line. Thus, electrodes 113, 115 cannot support a traveling wave.

SUMMARY OF THE INVENTION

An object of the invention is to optimize a traveling wave electrode structure on a reflective electro-optic modulator so as to minimize drive voltage into the tens of GHz range.

To achieve these and other objects, the invention is directed to an electro-optical modulator comprising: (a) a substrate; (b) an optical waveguide formed on the substrate; the optical waveguide comprising: (i) an input/output optical waveguide; and (ii) a plurality of optical waveguide arms, each of the optical waveguide arms having (I) a near end in optical communication with the input/output optical waveguide and (II) a far end, at least a first one of the plurality of optical waveguide arms having an optical characteristic which varies in accordance with an electric field applied thereto; (c) reflective means, disposed on the far end of each of the optical waveguide arms, for causing light propagating in said each of the optical waveguide arms toward the far end to be reflected at the far end; and (d) a microwave transmission line disposed on the substrate, the microwave transmission line being open-ended substantially at the far ends of the plurality of optical waveguide arms and comprising a first electrode disposed on the first one of the plurality of optical waveguide arms to apply the electric field to the first one of the optical waveguide arms. The invention is further directed to a method of modulating a light beam, the method comprising: (a) applying a portion of the light beam to each of a plurality of optical waveguide arms, at least a first one of the plurality of optical waveguide arms having an optical characteristic which varies in accordance with an electric field applied thereto, so that the portion of the light beam applied to said each of the plurality of optical waveguide arms travels from a near end to a far end of said each of the plurality of optical waveguide arms; (b) reflecting the portion of the light beam which has traveled from the near end to the distal end of said each of the plurality of optical waveguide arms so that the portion of the light beam travels from the far end back to the near end; (c) providing a microwave transmission line with an open end and disposing the microwave transmission line on at least the first one of the plurality of optical waveguide arms so that the open end is disposed substantially at the far end of the first one of the plurality of optical waveguide arms; (d) using the microwave transmission line to apply the electric field to the first one of the plurality of optical waveguide arms to vary the optical characteristic; and (e) causing the portions of the light beam which have been reflected back in step (b) to interfere with one another.

Reflective interferometers are currently used in RF and microwave link applications where small size and high voltage sensitivity are important factors. The present invention extends the operation of such reflective interferometers to higher frequencies, >2 GHz. Commercial applications can include cable TV and cellular telephone systems.

BRIEF DESCRIPTION OF THE DRAWINGS

A preferred embodiment of the present invention will now be described in detail with reference to the drawings, in which.

DETAILED DESCRIPTION

Figure 3:
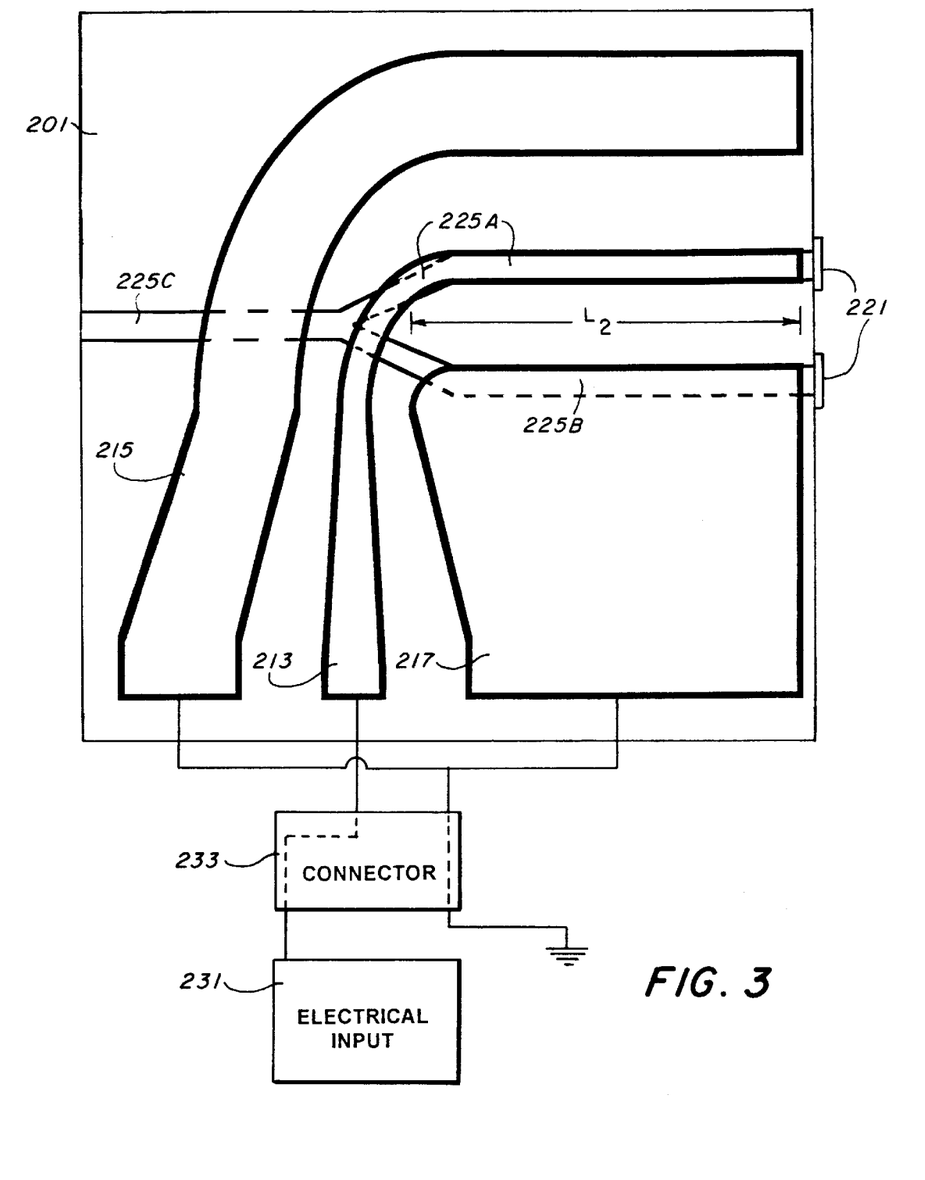
FIG. 3 shows a Mach-Zehnder interferometer according to the preferred embodiment.

FIG. 3 shows an electro-optic modulator of the reflective Mach-Zehnder interferometer type according to a preferred embodiment of the present invention. The interferometer of FIG. 3 is similar in construction and operation to that of FIG. 1, except as noted below. Details of the interferometer of FIG. 1 and of the references cited in connection therewith can be incorporated into the interferometer of FIG. 3 whenever doing so is consistent with the operation of the interferometer of FIG. 3 as set forth below.

Substrate 201 of $LiNbO_3$ has formed thereon an optical waveguide comprising input/output optical waveguide 225C, which is preferably a single-mode waveguide, and optical waveguide arms 225A, 225B with reflective coating 221 formed thereon. Conventionally, there is also a buffer layer, not shown, disposed between the waveguides and the device's electrodes (the latter discussed below). Electrodes 213, 215, 217 are formed on this buffer layer so that electrode 213 overlays optical waveguide arm 225A and electrode 217 overlays optical waveguide 225B. Electrodes 213, 215, 217 form a microwave transmission line which is open-ended in a vicinity of reflective coating 221. Electrode 213 is connected to electrical input 231, while electrodes 215 and 217 are grounded; the connection and grounding can be made through coaxial connector 233, any other suitable connector, or a hard-wired attachment. The arrangement shown in FIG. 3 provides an electrode length $L_2$ and an interaction length $2L_2$.

The traveling wave electrode structure (coplanar waveguide) formed by electrodes 213, 215, 217 is terminated with an open circuit very close to reflective coating 221 by which the optical beam is reflected. At the open circuit the electrical signal is also reflected with no phase change, identically to the optical reflection. Because the microwave wavelengths are large (~1 cm) compared to the optical wavelengths (~1 $\mu$m), the microwave reflections do not have to be exactly at the same point as the optical reflections; instead the open circuit and reflective coating 221 can be a few hundreds of microns apart, and the optical signal will still see essentially the same phase of the microwave signal. After the reflection, both the microwave signal and the optical signals will travel backwards in the device, while still interacting. It is preferable that the device be velocity matched, i.e., that the two waves have the same phase velocity, to avoid degradation in the optical response over these relatively long path lengths. The microwave signal then flows out of electrodes 213, 215, 217 after having been attenuated by RF loss over the double pass propagation length in the device. Depending on the frequency, such RF loss may significantly attenuate the microwave signal, so that returned power may be small.

Figure 4:
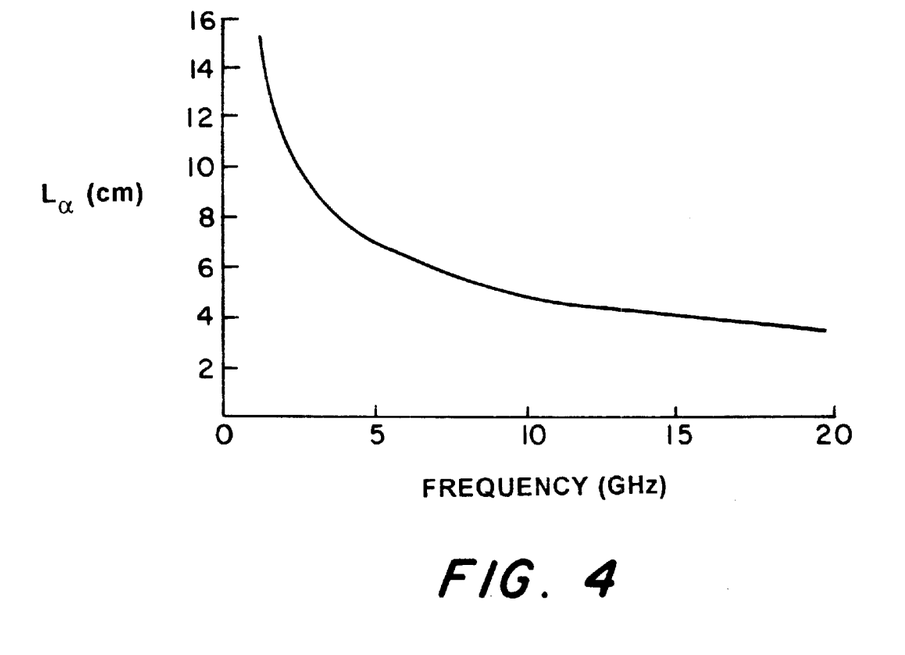
FIG. 4 shows a graph of attenuation length as a function of frequency for the Mach-Zehnder interferometer of FIG. 3.

FIG. 4 shows the loss coefficient as a function of frequency typical for a $LiNbO_3$ velocity-matched traveling wave modulator. The loss coefficient, $L_\alpha$, is defined as $L_\alpha = 1/\alpha$. From FIG. 4, one can see that an attenuation length of 4–6 cm is achieved for frequencies from 5–20 GHz. This is comparable to, indeed somewhat greater than, typical $LiNbO_3$ electrode lengths of 3–4 cm, indicating that the microwave signal at these frequencies would not be fully attenuated while traversing waveguide 213, 215, 217. This ensures that the optical and microwave signals will interreact over the entire length $L_2$.

As the device of FIG. 3 operates, incoming and reflected signal will counter-propagate in both the optical and microwave waveguides. This means that counterpropagating optical and microwave signals could interreact which in principle would cause deterioration in the ultimate signal output from the circuit. However, the interaction time of such counterpropagating signals is so small that the effects of such interaction is negligible at more than about 2 GHz.

Figure 5:
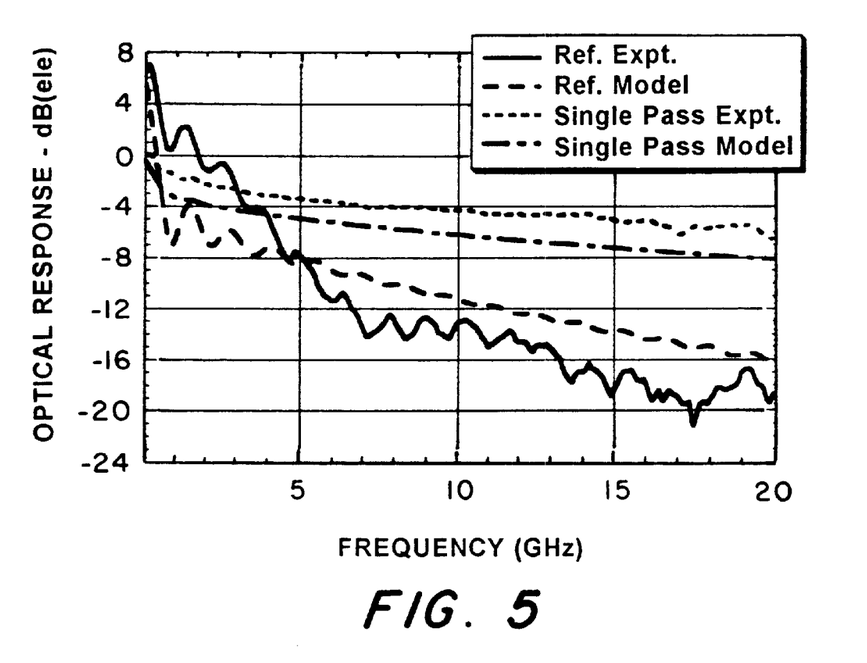
FIG. 5 shows calculated and experimental optical responses for the interferometers of FIGS. 1 and 3 for frequencies from 50 MHz to 20 GHz.
Figure 6:
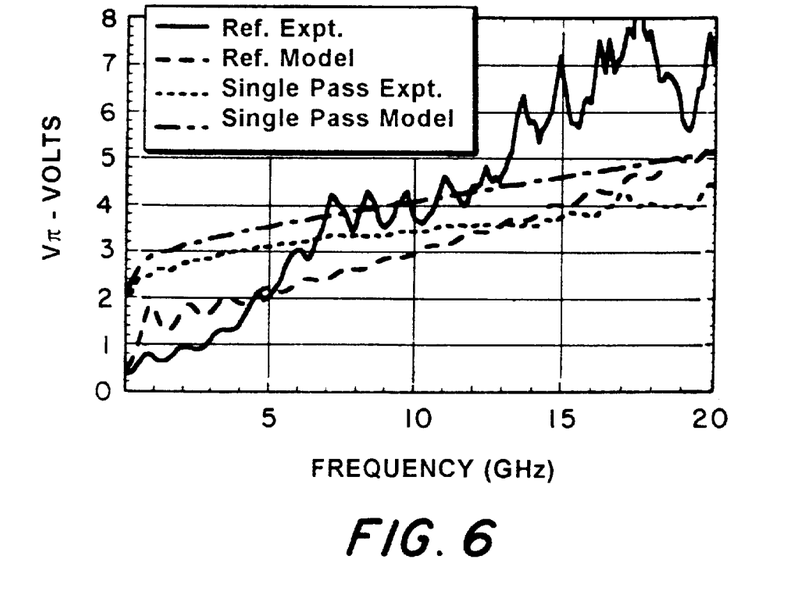
FIG. 6 shows the calculated and experimental drive voltages for the interferometers of FIGS. 1 and 3 in the same frequency range.

The performance, both experimental and according to a mathematical model, of the reflecting interferometer of FIG. 3 will now be compared with that of the known single-pass interferometer of FIG. 1 with reference to FIGS. 5 and 6. These results were derived for an interferometer according to FIG. 1 with an electrode length of 4.7 cm and for an interferometer according to FIG. 3 with an electrode length of 5.3 cm or a total interaction length of 10.6 cm. Both interferometers had RF loss $\alpha_0 = 0.07$ $(Ghz^{1/2}cm)^{-1}$, index mismatch $\Delta n = 0.06$, and device impedance $Z = 35\ \Omega$.

FIG. 5 shows calculated and experimental optical responses for the two interferometers for frequencies from 50 MHz to 20 Ghz. At low frequencies, the interferometer of FIG. 3 has an optical response which is superior by 6 dB.

FIG. 6 shows the calculated and experimental drive voltages for the two interferometers in the same frequency range. Drive voltage $V_\pi$ can be expressed in terms of frequency f and optical response or:

$$V_\pi(f)=V_\pi(0)10^{-\alpha/20}$$

The interferometer of FIG. 3 requires a lower drive voltage than the device of FIG. 1 for frequencies up to 7 GHz and theoretically up to 20 GHz. At frequencies up to ~5 GHz, the interferometer of FIG. 3 requires a drive voltage of less than 2 V, which is superior to the drive voltage required by the interferometer of FIG. 1 or any other known interferometer. The measured DC drive voltages for light at a wavelength of 1.3 μm is 2.0 V for the interferometer of FIG. 1 and 0.8 V for the interferometer of FIG. 3.

Figure 7:
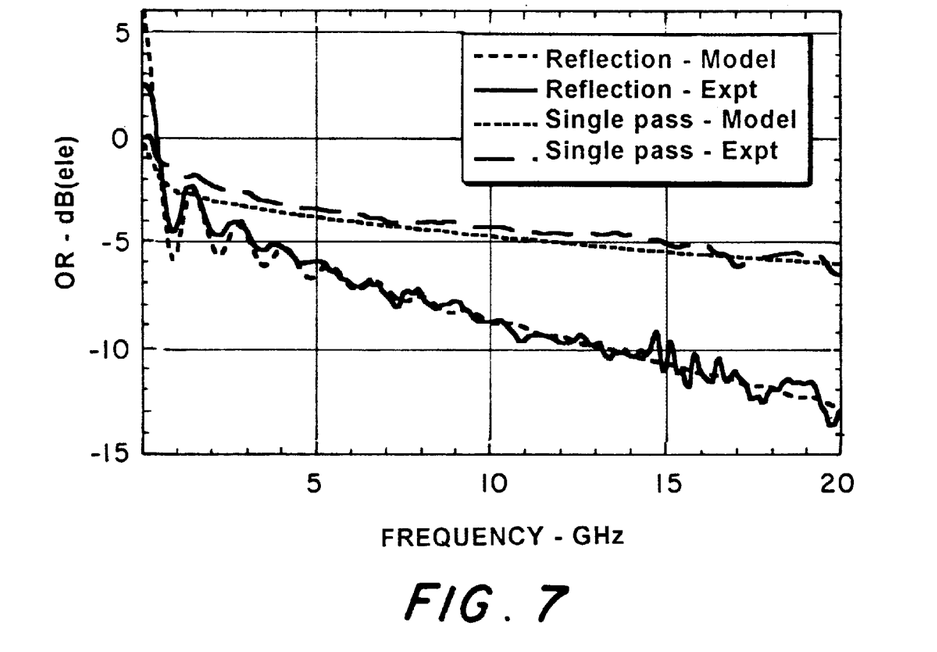
FIGS. 7 and 8 show additional test data like that of FIGS. 5–6.
Figure 8:
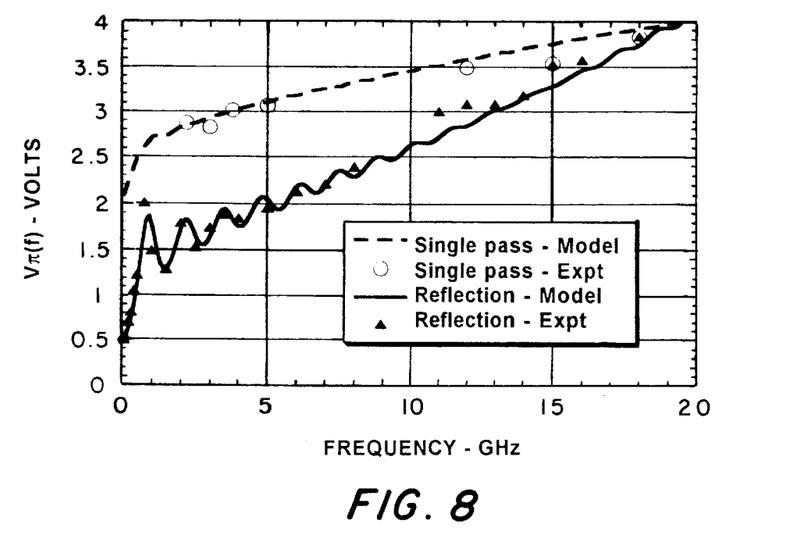

FIGS. 7 and 8 present the same data for test run on another device fabricated in the manner of the embodiment of FIG. 3. The device had a 5.3 cm electrode length, allowing a 10.6 cm. total interaction length. For comparison, a conventional single-pass interferometric device was fabricated having a 4.7 cm electrode length. Other device parameters were those reported in Gopalakrishnan et al., supra.

Measured DC $V_\pi$'s for these devices at 1.3 μm were 2.0V for the single pass interferometer and 0.95V for the reflection interferometer, giving a voltage-length product of 9–10 Vcm. Optical insertion losses were −6.5 dB for the single pass device and −10.4 dB for the reflection device. Calculated and experimental optical responses, referenced to DC operation, are shown in FIG. 7. The reflection device at low frequencies is enhanced by 6 dB relative to DC, due to the reflected RF field. This enhancement falls off at ~0.5 GHz with the loss of interaction between counterpropagating electrical and optical waves. Calculated and experimental drive voltages are shown in FIG. 8, which shows that the reflecting device provides lower drive voltage compared to a single pass interferometer of approximately the same length up to ~20 GHz. This demonstrates that very low drive voltages can be obtained by the use of long interaction lengths, and that a velocity matched reflection device is capable of broadband operation. The application of impedance matching techniques with lower RF losses will further reduce drive voltages below the values shown in FIGS. 5–8.

The present invention offers an advantage in that the optical phase is electrically controlled upon propagation in both directions in the device. This electrical control effectively doubles the effective electrode length of the device except for the RF loss. This doubling in turn reduces the drive voltage, which is the most important parameter for an optical modulator. Accordingly, the present invention offers a voltage-efficient way to extend a RC-limited reflective modulator (operation <2 GHz) to traveling-wave operation (0–40 GHz). A noteworthy feature is the opened electrode structure at the optically reflecting end of the device to reflect the microwave power without phase change, thus doubling the effective length of the device. This is preferably done with a velocity-matched structure so that the optical response is limited by predominately RF loss, and not velocity mismatch, which becomes important over long electrode lengths at high frequency.

Figure 9:
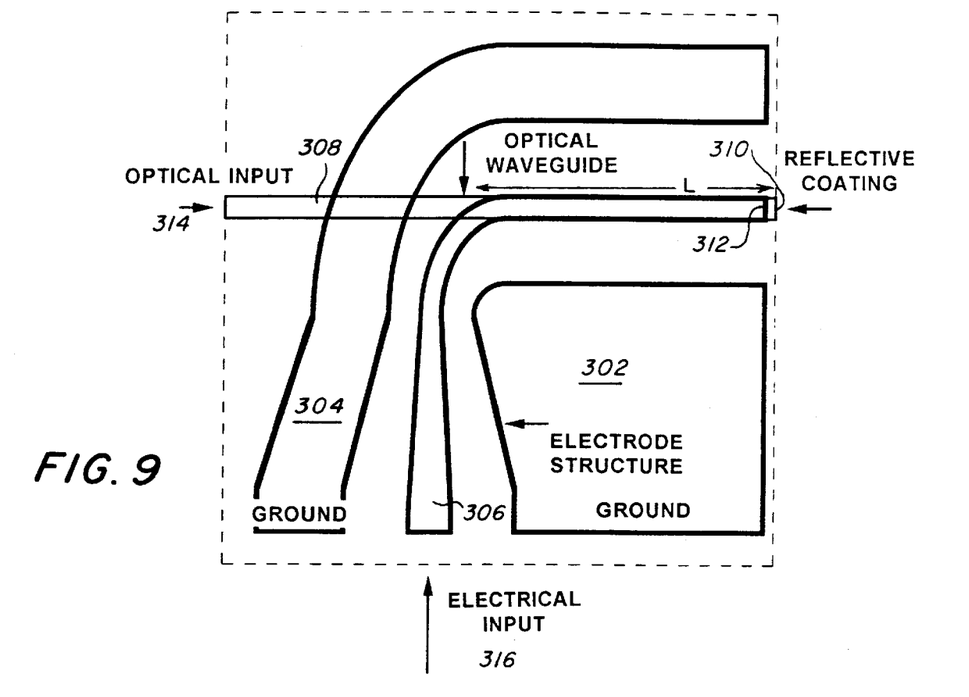
FIG. 9 shows a traveling wave phase modulator according to an embodiment of the invention.

While a preferred embodiment of the invention has been set forth in detail, those skilled in the art who have reviewed this disclosure will appreciate that other embodiments can be realized within the scope of the invention. For example, while the invention has been contemplated for use with LiNbO$_3$-type integrated optic modulators, the invention could be applied to other material systems. The present invention can be employed in phase modulators as well as in Mach-Zehnder amplitude interferometers. Such an electro-optic phase modulator is shown in U.S. Pat. No. 5,416,859 to Gopalakrishnan et al. Another such phase modulator is that of FIG. 9, which shows a microwave waveguide having portions 302, 304 at electrical ground, and a portion 306 to which the RF input 316 is applied. Optical waveguide 308 has a portion disposed proximate to portion 316 to form an interaction length L, along which RF signals in the microwave waveguide modulate the index of refraction of the optical waveguide. Members 314 and 316 are reflectively terminated at 310, 312, respectively, in the manner of the embodiment of FIG. 3, and both waveguides are velocity matched over the frequency band of interest. In operation, a microwave signal input at 316, and an optical signal input at 314, co-propagate along length L to reflective terminations 310, 312, where they are reflected back in the manner of the device of FIG. 3, providing an effective interaction length of 2 L, with the RF modulated optical signal exiting from the device at 314.

Additionally, an isolator could be used at the electrical input to absorb back-reflected power. It should be noted that the FIGS. 1–3 are shown for a Z-cut LiNbO$_3$ substrate, where the Z-axis is normal to the plane of the LiNbO$_3$ substrate. For an X- or Y- cut LiNbO$_3$ substrate the optical waveguide arms would be similarly formed in the substrate but one waveguide arm would be located between the center electrode and the grounded electrode while the other waveguide arm would be located between the center electrode and the other grounded electrode. Alternatively, one could as readily use a coplanar strip RF waveguide, which has only one ground, in the manner of the invention discussed above. The invention can be implemented in either structure for any cut of LiNbO$_3$ or another suitable material. Modifications disclosed separately can be combined. Therefore, the invention should be construed as limited only by the appended claims.

We claim:

1. An interferometer comprising:
   (a) a substrate;
   (b) an optical waveguide formed on the substrate; the optical waveguide comprising:
      (i) an input/output optical waveguide; and
      (ii) a plurality of optical waveguide arms, each of the optical waveguide arms having (I) a near end in optical communication with the input/output optical waveguide and (II) a far end, at least a first one of the plurality of optical waveguide arms having an optical characteristic which varies in accordance with an electric field applied thereto;
   (c) reflective means, disposed on the far end of each of the optical waveguide arms, for causing light propagating in said each of the optical waveguide arms toward the distal end to be reflected at the distal end; and
   (d) a microwave transmission line disposed on the substrate, the microwave transmission line being open-ended substantially at the distal ends of the plurality of optical waveguide arms and comprising a first electrode disposed on the first one of the plurality of optical waveguide arms to apply the electric field to the first one of the optical waveguide arms.

2. An interferometer as in claim 1, wherein the microwave transmission line further comprises a second electrode disposed on another one of the plurality of optical waveguide arms.

3. An interferometer as in claim 2, wherein the microwave transmission line further comprises connector means for connecting the first electrode to an electrical input and the second electrode to ground.

4. An interferometer as in claim 2, wherein the microwave transmission line further comprises a third electrode which is not disposed on any of the plurality of optical waveguide arms.

5. An interferometer as in claim 4, wherein the microwave transmission line further comprises connector means for connecting the first electrode to an electrical input and the second and third electrodes to ground.

6. An interferometer as in claim 5, wherein the first electrode is disposed between the second and third electrodes.

7. An interferometer as in claim 1, wherein the reflective means comprises a reflective coating.

8. An interferometer as in claim 1, wherein the substrate comprises $LiNbO_3$.

9. An interferometer as in claim 1, wherein the input/output optical waveguide comprises a single-mode optical waveguide.

10. A method of modulating a light beam, the method comprising:
  (a) applying a portion of the light beam to each of a plurality of optical waveguide arms, at least a first one of the plurality of optical waveguide arms having an optical characteristic which varies in accordance with an electric field applied thereto, so that the portion of the light beam applied to said each of the plurality of optical waveguide arms travels from a proximal end to a distal end of said each of the plurality of optical waveguide arms;
  (b) reflecting the portion of the light beam which has traveled from the proximal end to the distal end of said each of the plurality of optical waveguide arms so that the portion of the light beam travels from the distal end back to the proximal end;
  (c) providing a microwave transmission line with an open end and disposing the microwave transmission line on at least the first one of the plurality of optical waveguide arms so that the open end is disposed substantially at the distal end of the first one of the plurality of optical waveguide arms;
  (d) using the microwave transmission line to apply the electric field to the first one of the plurality of optical waveguide arms to vary the optical characteristic; and
  (e) causing the portions of the light beam which have been reflected back in step (b) to interfere with one another.

11. A method as in claim 10, wherein step (e) comprises causing the portions of the light beam to interfere with one another in a single-mode optical waveguide.

12. A method as in claim 10, wherein the light beam and the electric field have substantially equal phase velocities.

13. An electro-optic modulator, comprising:
  a microwave waveguide and an optical waveguide, each said waveguide being substantially velocity matched; wherein
  said optical waveguide is branched into two electrically parallel arms;
  said microwave waveguide has two conductor portions;
  each of said arms and each of said conductor portions has a reflective termination; wherein
  one of said portions of said microwave waveguide is disposed proximate to one of said arms of said optical waveguide effective to cause electro-optic interaction therebetween; and the other of said portions of said microwave waveguide is disposed proximate to the other of said arms of said optical waveguide effective to cause electro-optic interaction therebetween.

14. An electro-optic modulator, comprising:
  an optical waveguide; and
  a microwave waveguide; wherein
  each said waveguide is disposed proximate to one another effective to permit an RF signal in said microwave waveguide to modulate the index of refraction of a portion of said optical waveguide;
  each said waveguide is reflectively terminated; and
  each said waveguide is substantially velocity matched to the other.

* * * * *